United States Patent
Yazaki (10) Patent No.: US 12,030,395 B2
(45) Date of Patent: Jul. 9, 2024

(54) FOREIGN OBJECT REMOVAL DEVICE AND POWER TRANSMISSION DEVICE

(71) Applicant: IHI Corporation, Tokyo (JP)

(72) Inventor: Satoshi Yazaki, Tokyo (JP)

(73) Assignee: IHI Corporation, Tokyo (JP)

( * ) Notice: Subject to any disclaimer, the term of this patent is extended or adjusted under 35 U.S.C. 154(b) by 183 days.

(21) Appl. No.: 17/429,365

(22) PCT Filed: Feb. 5, 2020

(86) PCT No.: PCT/JP2020/004429
§ 371 (c)(1),
(2) Date: Aug. 9, 2021

(87) PCT Pub. No.: WO2020/230380
PCT Pub. Date: Nov. 19, 2020

(65) Prior Publication Data
US 2022/0126709 A1    Apr. 28, 2022

(30) Foreign Application Priority Data

May 15, 2019  (JP) .................................. 2019-092010

(51) Int. Cl.
*H02J 50/90*  (2016.01)
*B60L 53/124*  (2019.01)
*H02J 50/12*  (2016.01)
*H02J 50/60*  (2016.01)

(52) U.S. Cl.
CPC ............ *B60L 53/124* (2019.02); *H02J 50/12* (2016.02); *H02J 50/60* (2016.02); *H02J 50/90* (2016.02)

(58) Field of Classification Search
CPC ....................................................... H02J 50/60
See application file for complete search history.

(56) References Cited

U.S. PATENT DOCUMENTS

| | | | |
|---|---|---|---|
| 10,454,310 B2* | 10/2019 | Fujiwara | ............... B60L 53/126 |
| 2015/0123489 A1 | 5/2015 | Niizuma | |
| 2017/0043672 A1 | 2/2017 | Araki et al. | |
| 2017/0141623 A1* | 5/2017 | Jamieson | .............. H04B 5/0037 |
| 2020/0031246 A1* | 1/2020 | Tanaka | .................. B60L 53/124 |
| 2022/0103020 A1* | 3/2022 | Moon | ...................... H02J 50/12 |

FOREIGN PATENT DOCUMENTS

| | | |
|---|---|---|
| EP | 3073601 A1 | 9/2016 |
| JP | 2014-023296 A | 2/2014 |
| JP | 2014-027772 A | 2/2014 |
| JP | 2016-013033 A | 1/2016 |
| JP | 2018-057194 A | 4/2018 |
| WO | 2014/017281 A1 | 1/2014 |
| WO | 2016/002619 A1 | 1/2016 |

* cited by examiner

*Primary Examiner* — Daniel Kessie
(74) *Attorney, Agent, or Firm* — Volpe Koenig (57) ABSTRACT

A foreign object removal device removes a foreign object on a vehicle-body undersurface of a vehicle traveling a road surface in wireless power transfer from a power transmission unit of a power transmission device installed on the road surface to a power reception unit of a power reception device mounted on the vehicle-body undersurface, and comprises a foreign object removal unit installed on the road surface around the power transmission unit and removing the foreign object on the vehicle-body undersurface.

5 Claims, 6 Drawing Sheets

FOREIGN OBJECT REMOVAL DEVICE AND POWER TRANSMISSION DEVICE

TECHNICAL FIELD

The present disclosure relates to a foreign object removal device and a power transmission device.

BACKGROUND ART

Technology relating to wireless power transfer from a power transmission unit of a power transmission device installed on a road surface of a parking lot and the like to a power reception unit of a power reception device mounted on a vehicle-body undersurface of a vehicle traveling the road surface is known. By chewing gum and oil, metal foreign objects such as a wrapping paper of the chewing gum may adhere to the power reception unit on the vehicle-body undersurface of the vehicle. When a metal foreign object adheres to the power reception unit, the temperature around the foreign object may rise and the power transmission efficiency of the wireless power transfer may decrease. Thus, in Patent Literature 1, for example, technology of removing a foreign object by using a coil of a power transmission unit as an electromagnet by causing a direct current to flow through the coil of the power transmission unit when a coil of a power reception unit is in a non-energized state in wireless power transfer is disclosed.

CITATION LIST

Patent Literature

[Patent Literature 1] Japanese Unexamined Patent Publication No. 2018-57194

SUMMARY OF INVENTION

Technical Problem

Incidentally, in the abovementioned technology, when the power transmission unit is installed on the road surface of the parking lot and the like and the power reception unit is mounted on the vehicle-body undersurface of the vehicle traveling the road surface, a foreign object may fall on the power transmission unit that has removed the foreign object from the power reception unit as the electromagnet. The temperature around the foreign object may rise and the power transmission efficiency of the wireless power transfer may decrease also when a metal foreign object is present on the power transmission unit.

Therefore, the present disclosure describes a power transmission device and a foreign object removal device capable of removing a foreign object on a power reception unit and reducing a case where the removed foreign object falls on a power transmission unit.

Solution to Problem

A foreign object removal device according to one aspect of the present disclosure is a foreign object removal device removing a foreign object on a vehicle-body undersurface of a vehicle traveling a road surface in wireless power transfer from a power transmission unit of a power transmission device installed on the road surface to a power reception unit of a power reception device mounted on the vehicle-body undersurface, the foreign object removal device comprising a foreign object removal unit installed on the road surface around the power transmission unit and removing the foreign object on the vehicle-body undersurface.

Advantageous Effects of Invention

According to the foreign object removal device and the power transmission device of the present disclosure, the foreign object on the power reception unit can be removed and a case where the removed foreign object falls on the power transmission unit can be reduced.

DESCRIPTION OF EMBODIMENTS

A foreign object removal device according to one aspect of the present disclosure is a foreign object removal device removing a foreign object on a vehicle-body undersurface of a vehicle traveling a road surface in wireless power transfer from a power transmission unit of a power transmission device installed on the road surface to a power reception unit of a power reception device mounted on the vehicle-body undersurface, the foreign object removal device comprising a foreign object removal unit installed on the road surface around the power transmission unit and removing the foreign object on the vehicle-body undersurface.

According to this foreign object removal device, in the foreign object removal device that removes the foreign object on the vehicle-body undersurface in the wireless power transfer from the power transmission unit of the power transmission device installed on the road surface to the power reception unit of the power reception device mounted on the vehicle undersurface traveling the road surface, the foreign object on the vehicle-body undersurface is removed by the foreign object removal unit installed on the road surface around the power transmission unit. Therefore, the foreign object on the power reception unit can be removed and a case where the removed foreign object falls on the power transmission unit can be reduced.

In some modes, the foreign object removal unit may have an electromagnet installed on the road surface.

According to this configuration, the foreign object removal unit has the electromagnet installed on the road surface, and hence the foreign object on the vehicle-body undersurface can be removed by a simple configuration.

In some modes, a detection unit detecting an approach of the vehicle to either the power transmission unit or the foreign object removal unit, and a control unit stopping the foreign object removal unit when the detection unit is not detecting the approach of the vehicle to either the power transmission unit or the foreign object removal unit, and activating the foreign object removal unit when the detection unit detects the approach of the vehicle to either the power transmission unit or the foreign object removal unit may be further comprised.

According to this configuration, the approach of the vehicle to either the power transmission unit or the foreign object removal unit is detected by the detection unit. By the control unit, the foreign object removal unit is stopped when the detection unit is not detecting the approach of the vehicle to either the power transmission unit or the foreign object removal unit, and the foreign object removal unit is activated when the detection unit detects the approach of the vehicle to either the power transmission unit or the foreign object removal unit. Therefore, it is possible to activate the foreign object removal unit only when necessary, and the energy consumed by the foreign object removal unit can be reduced.

In some modes, the detection unit may detect stopping of the vehicle in a position in which the power transmission unit and the power reception unit face each other, and the control unit may stop activation of the foreign object removal unit when the foreign object removal unit is activated and the detection unit detects stopping of the vehicle in the position in which the power transmission unit and the power reception unit face each other.

According to this configuration, the stopping of the vehicle in the position in which the power transmission unit and the power reception unit face each other is detected by the detection unit. When the foreign object removal unit is activated and the stopping of the vehicle in the position in which the power transmission unit and the power reception unit face each other is detected by the detection unit, the power transmission unit and the power reception unit are facing each other, and the removal of the foreign object adhering to the power reception unit by the foreign object removal unit installed on the road surface around the power transmission unit becomes difficult. Therefore, the activation of the foreign object removal unit is stopped by the control unit. As a result, it is possible to activate the foreign object removal unit only when the possibility that the foreign object removal unit can remove the foreign object is high, and the energy consumed by the foreign object removal unit can be reduced.

In some modes, a road surface maintenance unit removing the foreign object that has been removed from the vehicle-body undersurface by the foreign object removal unit and has fallen on the road surface from the road surface may be further comprised.

According to this configuration, the foreign object that has been removed from the vehicle-body undersurface by the foreign object removal unit and has fallen on the road surface is removed from the road surface by the road surface maintenance unit, and hence a case where the foreign object removed from the vehicle-body undersurface by the foreign object removal unit comes into contact with the power transmission unit on the road surface by wind and the like can be reduced.

In some modes, the foreign object removal unit may be installed in a route by which the vehicle reaches the power transmission unit on the road surface.

According to this configuration, the foreign object removal unit is installed in the route by which the vehicle reaches the power transmission unit on the road surface, and hence the foreign object on the vehicle-body undersurface can be removed more reliably before the wireless power transfer.

A power transmission device according to another aspect of the present disclosure comprises: the foreign object removal device according to one aspect of the present disclosure; and the power transmission unit.

An embodiment of the present disclosure is described below with reference to the drawings.

Figure 1:
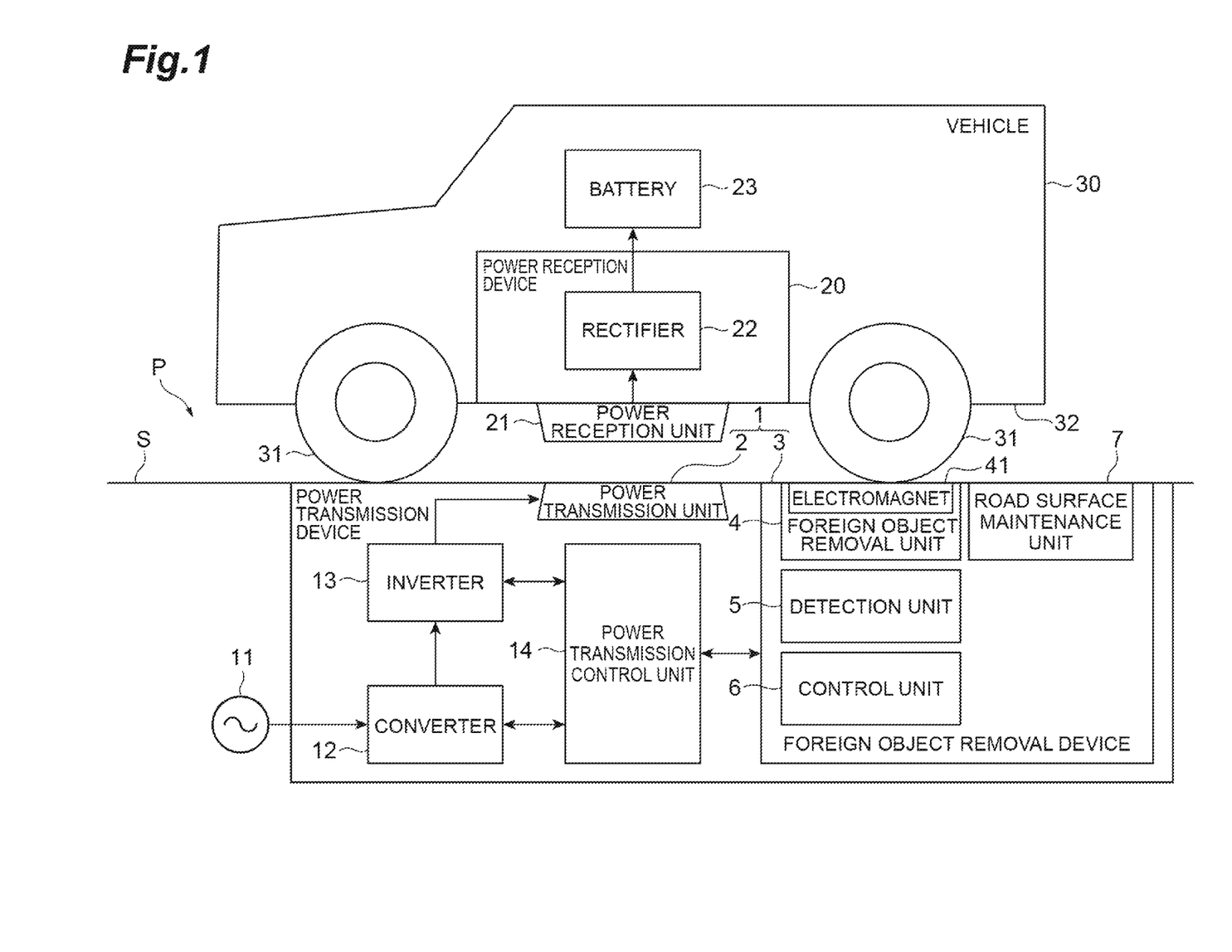
FIG. 1 is a block diagram showing a foreign object removal device and a power transmission device according to an embodiment.

As shown in FIG. 1, a power transmission device 1 according to a first embodiment includes a power transmission unit 2 and a foreign object removal device 3. The power transmission device 1 supplies power to a power reception unit 21 of a power reception device 20 mounted on a vehicle-body undersurface 32 of a vehicle 30 traveling a road surface S from the power transmission unit 2 of the power transmission device 1 installed on the road surface S by wireless power transfer. The power transmission device 1 is installed in, for example, a parking space of a parking lot.

The vehicle 30 is, for example, an electric motor vehicle. The power transmission device 1 is configured to supply power to the power reception device 20 mounted on the vehicle 30 such as an electric motor vehicle that has arrived at the parking space of the parking lot and the like with use of magnetic coupling between coils by a magnetic field resonance method, an electromagnetic induction method, and the like. Note that the vehicle 30 may be various mobile objects such as a plug-in hybrid vehicle or an underwater vehicle instead of the electric motor vehicle. The vehicle 30 may be an automated guided vehicle (AGV) instead of a manned vehicle.

As shown in FIG. 1, the power transmission device 1 includes the power transmission unit 2, the foreign object removal device 3, a converter 12, an inverter 13, and a power transmission control unit 14. The power transmission device 1 is supplied with power from an external power source 11. The power source 11 supplies power necessary for generating power to be transmitted to the vehicle 30, and supplies single-phase AC power like a commercial AC power source, for example. Note that the power source 11 is not limited to a single-phase AC power source and may be a power source that supplies three-phase AC power.

The converter 12 is an AC/DC converter that rectifies the AC power supplied from the power source 11 and converts the AC power into DC power. The converter 12 may have a power factor correction (PFC) function and a back-boost function. Note that a DC power source such as a fuel cell or a solar battery can be used as the power source 11, and the converter 12 can be omitted in that case. When the power source 11 is a DC power source, a DC/DC converter may be provided instead of the converter 12. The inverter 13 converts the DC power from the converter 12 into AC power (high frequency power) of which frequency is higher than that of the AC power of the power source 11 and supplies the AC power (high frequency power) to the power transmission unit 2.

The power transmission control unit 14 is an electronic control unit including, for example, a central processing unit (CPU), a read only memory (ROM), and a random access memory (RAM). The power transmission control unit 14 controls power supply from the power transmission unit 2 of the power transmission device 1 to the power reception unit 21 of the power reception device 20. The power transmission control unit 14 controls the operations of the converter 12 and the inverter 13 to change the magnitude of the power transmitted from the power transmission unit 2 of the power transmission device 1 to the power reception unit 21 of the power reception device 20. As described below, the power transmission control unit 14 starts power transmission from a power transmission unit 15 of the power transmission device 1 to the power reception unit 21 of the power reception device 20 when the foreign object removal device 3 stops the operation of removing a foreign object and the foreign object is removed from the road surface S.

The power transmission unit 2 is a coil device installed on the road surface S of the parking space of the parking lot and the like. The power reception unit 21 of the power reception device 20 is a coil device mounted on the vehicle-body undersurface 32 of the vehicle 30. An electromagnetic coupling circuit is formed by bringing the power transmission unit 2 and the power reception unit 21 close to each other. The electromagnetic coupling circuit refers to a circuit in which the power transmission unit 2 and the power reception unit 21 are electromagnetically coupled to each other and power transmission is performed by wireless power transfer from the power transmission unit 2 to the power reception unit 21. Note that the power transmission unit 2 and the power reception unit 21 may perform wireless power transfer by an electromagnetic induction method or may perform wireless power transfer by a magnetic field resonance method. The power transmission unit 2 and the power reception unit 21 may be antenna devices.

The foreign object removal device 3 removes a foreign object on the vehicle-body undersurface 32 of the vehicle 30 traveling the road surface S in the wireless power transfer from the power transmission unit 2 of the power transmission device 1 installed on the road surface S to the power reception unit 21 of the power reception device 20 mounted on the vehicle-body undersurface 32. The foreign object is a metal object that causes heat generation between the power transmission unit 2 and the power reception unit 21. The foreign object is, for example, a wrapping paper and the like of confectionery such as a chewing gum adhering to the power reception unit 21 on the vehicle-body undersurface 32 of the vehicle 30 by the chewing gum, oil, and the like. Note that, when the foreign object is adhering to the vehicle-body undersurface 32, the foreign object adhering to the vehicle-body undersurface 32 may fall on the power transmission unit 2 and cause heat generation between the power transmission unit 2 and the power reception unit 21 even when the foreign object is not adhering to the power reception unit 21. Therefore, the foreign object removal device 3 of this embodiment also removes a foreign object adhering to a position other than the position in which the power reception unit 21 is installed on the vehicle-body undersurface 32.

Figure 2:
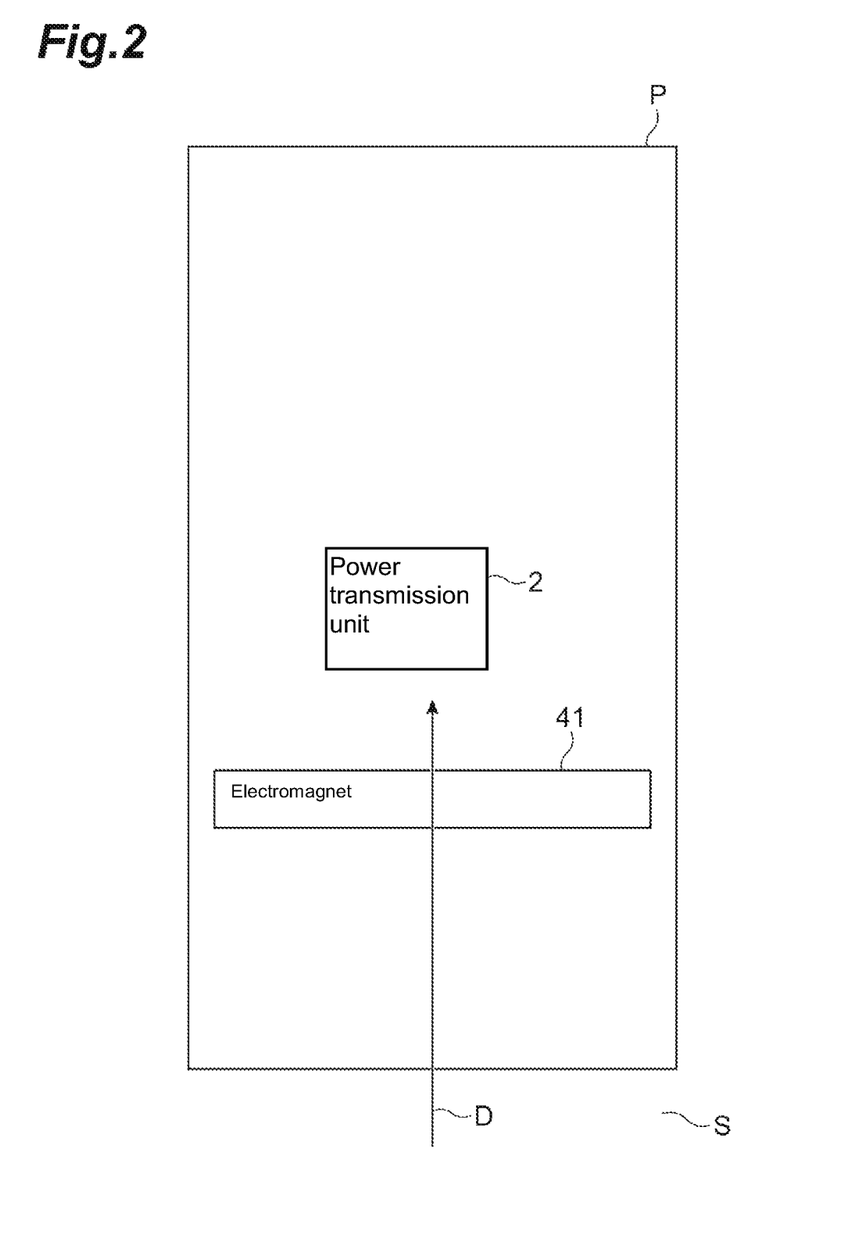
FIG. 2 is a plan view showing the arrangement of a power transmission unit and an electromagnet with respect to a route of a vehicle in a parking space.

The foreign object removal device 3 includes a foreign object removal unit 4, a detection unit 5, a control unit 6, and a road surface maintenance unit 7. The foreign object removal unit 4 is installed on the road surface S around the power transmission unit 2 and removes the foreign object on the vehicle-body undersurface 32. The expression of "the foreign object removal unit 4 is installed on the road surface S around the power transmission unit 2" means that, for example, the foreign object removal unit 4 is not installed in the same position as the power transmission unit 2 on the road surface S and is installed in a range from a position adjacent to the power transmission unit 2 to a position within 10 m from the power transmission unit 2. The foreign object removal unit 4 has an electromagnet 41 installed on the road surface S. The foreign object removal unit 4 is installed in a route by which the vehicle 30 reaches the power transmission unit 2 on the road surface S. For example, as shown in FIG. 2, when the power transmission unit 2 is installed in a central portion of a parking space P of a parking lot, the electromagnet 41 of the foreign object removal unit 4 having a rectangular shape in plan view is installed such that a route D by which the vehicle 30 travels straight forward or backward and reaches the power transmission unit 2 in the central portion of the parking space P on the road surface S and the long side of the electromagnet are orthogonal to each other.

When the foreign object is a ferromagnet such as iron, the electromagnet 41 of the foreign object removal unit 4 can remove the foreign object from the vehicle-body undersurface 32 by attracting the foreign object to the electromagnet 41 from the vehicle-body undersurface 32 of the vehicle 30 by the magnetic force of the electromagnet 41. When the foreign object is a paramagnet such as aluminum, a magnetic field is generated by the eddy current generated in the foreign object when the foreign object passes through the magnetic field of the electromagnet 41 in accordance with the traveling of the vehicle 30. The magnetic force caused by the magnetic field generated by the eddy current repels the magnetic force caused by the magnetic field of the electromagnet 41. Therefore, a force works on the foreign object in a direction opposite to the traveling direction of the vehicle 30. Therefore, even when the foreign object is a paramagnet such as aluminum, the electromagnet 41 of the foreign object removal unit 4 can remove the foreign object from the vehicle-body undersurface 32 by the force working on the foreign object in the direction opposite to the traveling direction of the vehicle 30.

The detection unit 5 shown in FIG. 1 detects an approach of the vehicle 30 to either the power transmission unit 2 or the foreign object removal unit 4. The detection unit 5 detects the stopping of the vehicle 30 in the position in which the power transmission unit 2 and the power reception unit 21 face each other. For example, the detection unit 5 includes a wireless communication device, and detects the approach, the position, and the stopping of the vehicle 30 by wireless communication with a wireless communication device mounted on the vehicle 30.

Note that, for example, the detection unit 5 may include a distance sensor that measures the distance from the vehicle 30, and may detect the position, the approach, and the stopping of the vehicle 30 on the basis of the measured distance from the vehicle 30. For example, the detection unit 5 may include a weight sensor that detects the weight of the vehicle 30 on the road surface S, and may detect the position, the approach, and the stopping of the vehicle 30 on the basis of the detected weight of the vehicle 30. For example, the detection unit 5 may include a microphone that detects the engine sound of the vehicle 30, and may detect the position, the approach, and the stopping of the vehicle 30 on the basis of the detected engine sound of the vehicle 30. For example, the detection unit 5 may include an ultrasonic sensor that detects ultrasonic waves emitted by a sonar of the vehicle 30, and may detect the position, the approach, and the stopping of the vehicle 30 on the basis of the detected ultrasonic waves of the sonar of the vehicle 30.

The control unit 6 shown in FIG. 1 controls the operation of the foreign object removal device 3. The control unit 6 stops the foreign object removal unit 4 when the detection unit 5 is not detecting the approach of the vehicle 30 to either the power transmission unit 2 or the foreign object removal unit 4, and activates the foreign object removal unit 4 when the detection unit 5 detects the approach of the vehicle 30 to either the power transmission unit 2 or the foreign object removal unit 4. The control unit 6 stops the activation of the foreign object removal unit 4 when the foreign object removal unit 4 is activated and the detection unit 5 detects the stopping of the vehicle 30 in the position in which the power transmission unit 2 and the power reception unit 21 face each other. The control unit 6 is an electronic control unit including a CPU, a ROM, and a RAM, for example, as with the power transmission control unit 14.

Figure 3:
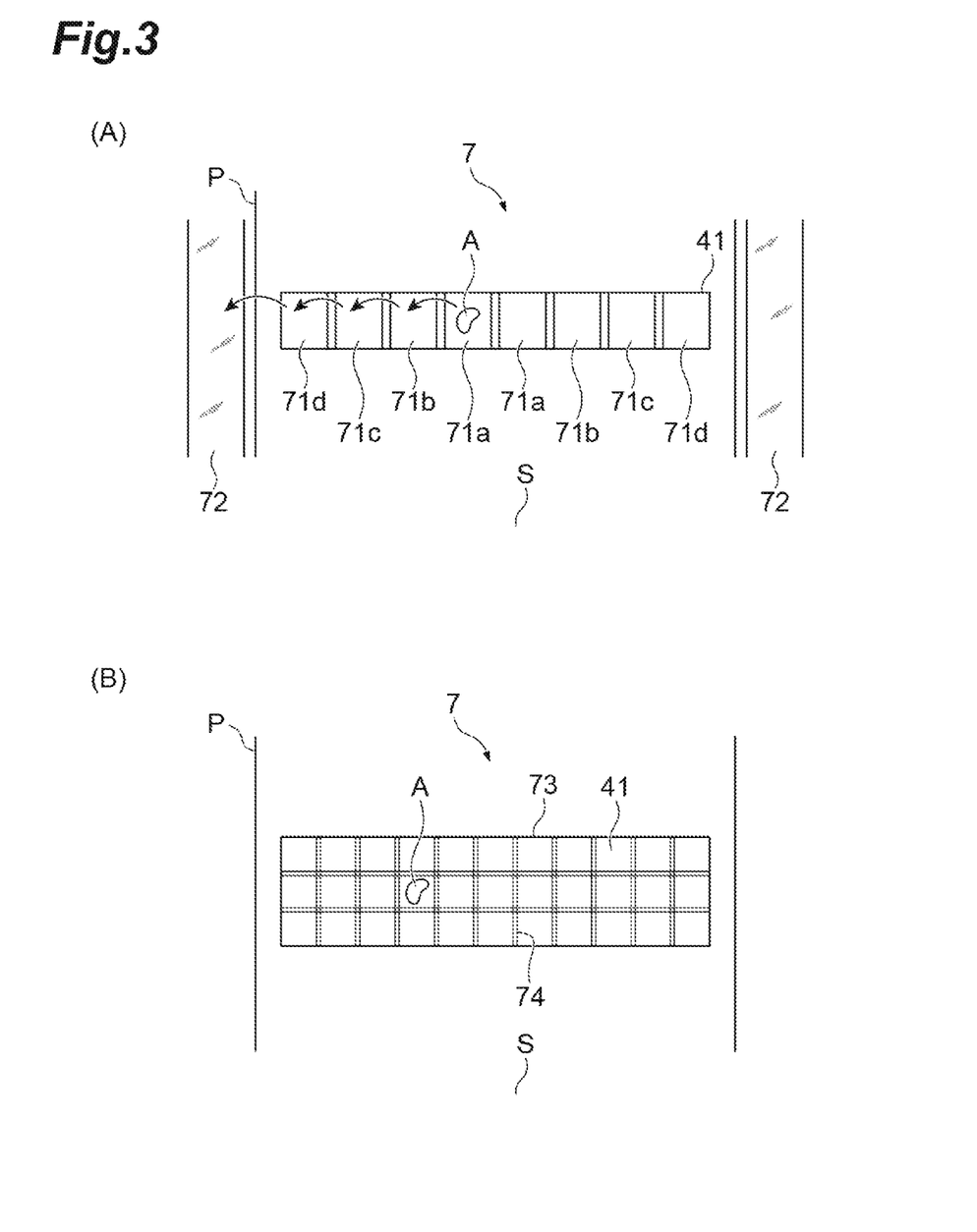
FIG. 3A is a plan view showing one mode of a road surface maintenance unit.
FIG. 3B is a plan view showing another mode of the road surface maintenance unit.

The road surface maintenance unit 7 shown in FIG. 1 removes the foreign object that has been removed from the vehicle-body undersurface 32 by the foreign object removal unit 4 and has fallen on the road surface S from the road surface S. As shown in FIG. 3A, for example, the road surface maintenance unit 7 has a plurality of electromagnets 71a, 71b, 71c, and 71d obtained by dividing both of the long sides of the electromagnet 41 of the foreign object removal unit 4 having a rectangular shape in plan view, and grooves 72 in the vicinity of both of the short sides of the electromagnet 41. For example, when a foreign object A removed from the vehicle-body undersurface 32 by the electromagnet 41 falls on the electromagnet 71a, the electromagnets 71b, 71c, and 71d generate magnetic force and then stop the generation of the magnetic force in the order of the electromagnet 71b, the electromagnet 71c, and the electromagnet 71d. As a result, the foreign object A is sequentially moved on the electromagnets 71a, 71b, 71c, and 71d, falls into the groove 72 in the vicinity of the electromagnet 71d, and is removed from the road surface S.

As shown in FIG. 3B, for example, the road surface maintenance unit 7 may have a recessed portion 73 recessed from the road surface S and housing the electromagnet 41 of the foreign object removal unit 4 on the bottom surface thereof, and a grating 74 covering the upper side of the recessed portion 73. For example, the foreign object A removed from the vehicle-body undersurface 32 by the electromagnet 41 falls on the bottom surface of the recessed portion 73 through the grating 74. As a result, the foreign object A is removed from the road surface S. Note that the road surface maintenance unit 7 may remove the foreign object A from the road surface S by any of jetting of gas to the road surface S, jetting of liquid to the road surface S, and mechanical means such as a wiper.

Meanwhile, the power reception device 20 mounted on the vehicle 30 includes the power reception unit 21 and a rectifier 22. The power reception device 20 is a device that receives power from the power transmission unit 2 of the power transmission device 1 and supplies the power to a load such as a battery 23 of the vehicle 30. As described above, the power reception unit 21 is a coil device mounted between four wheels 31 on the vehicle-body undersurface 32 of the vehicle 30. The magnetic flux generated in the power transmission unit 2 is interlinked with the power reception unit 21, so that the power reception unit 21 generates induced current. As a result, the power reception unit 21 wirelessly receives power from the power transmission unit 2. The rectifier 22 rectifies AC power received by the power reception unit 21 from the power transmission unit 2 and converts the AC power into the DC power. The DC power converted by the rectifier 22 is supplied to the load such as the battery 23 of the vehicle 30.

Figure 4:
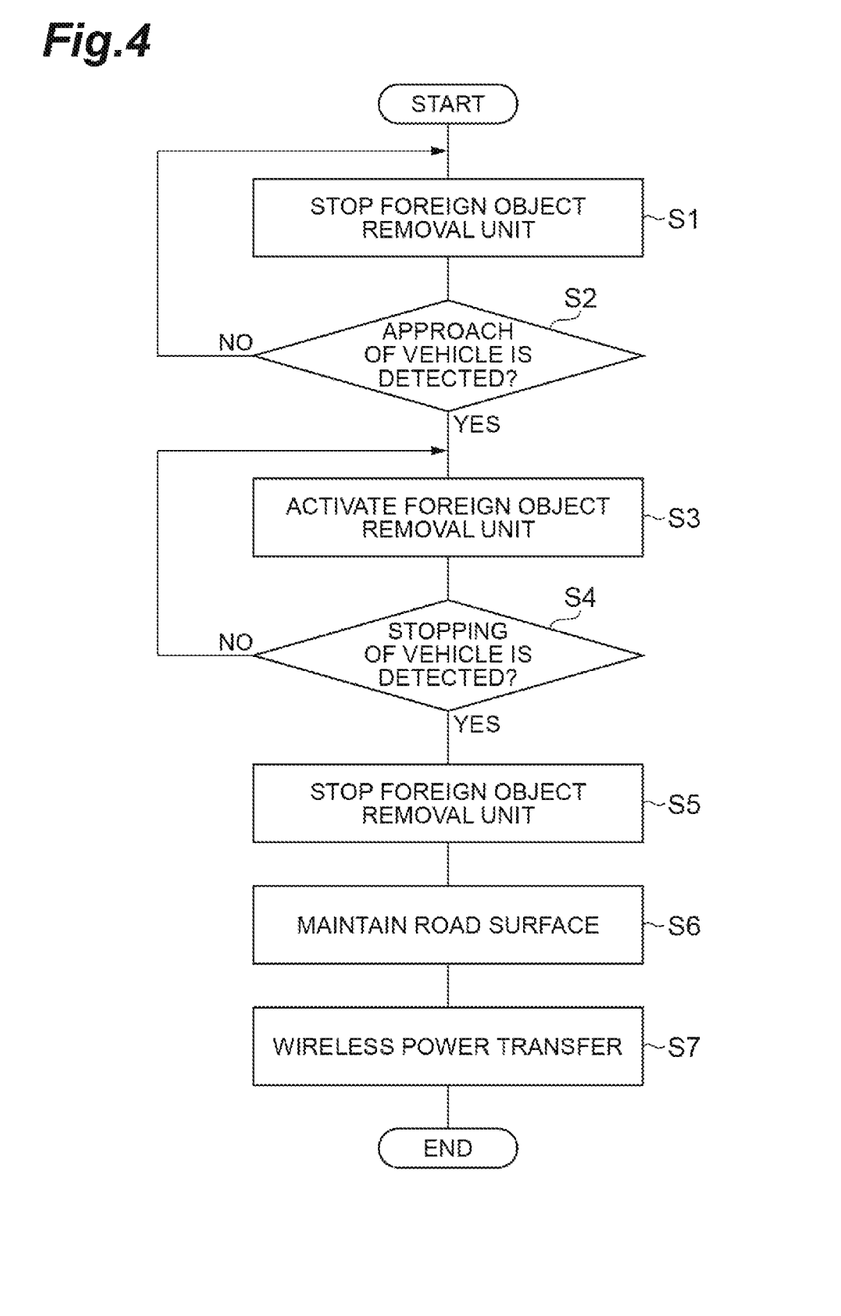
FIG. 4 is a flowchart showing the operation of the foreign object removal device according to the embodiment.
Figure 5A:
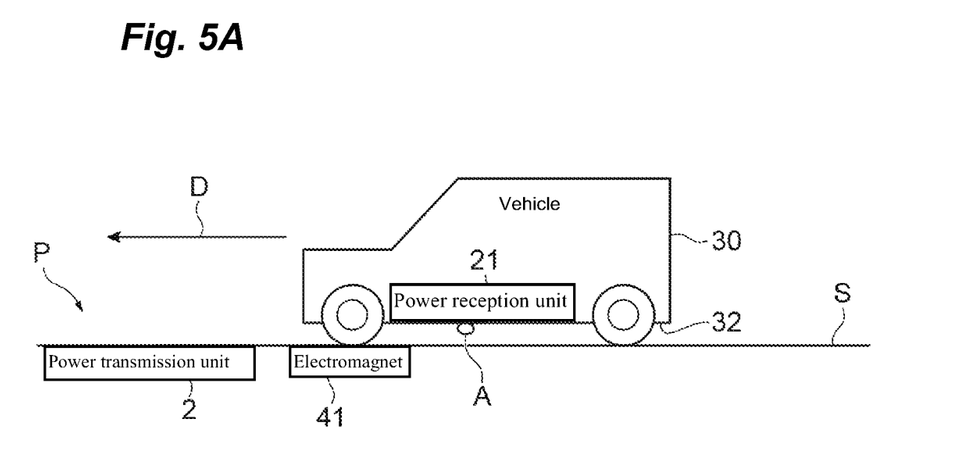
FIG. 5A, FIG. 5B, and FIG. 5C are side views showing the operation of the foreign object removal device according to the embodiment.

The operations of the power transmission device 1 and the foreign object removal device 3 of this embodiment are described below. As shown in FIG. 4, when the detection unit 5 is not detecting the approach of the vehicle 30 to either the power transmission unit 2 or the foreign object removal unit 4, the control unit 6 of the foreign object removal device 3 stops the foreign object removal unit 4 (S1). When the foreign object removal unit 4 is stopped, the electromagnet 41 of the foreign object removal unit 4 does not generate magnetic force. As shown in FIG. 5A, the vehicle 30 in which the foreign object A is adhering to the power reception unit 21 on the vehicle-body undersurface 32 approaches the power transmission unit 2 and the electromagnet 41 of the foreign object removal unit 4 in the parking space P for wireless power transfer. As shown in FIG. 4, when the detection unit 5 detects the approach of the vehicle 30 to either the power transmission unit 2 or the foreign object removal unit 4 (S2), the control unit 6 activates the foreign object removal unit 4 (S3). When the foreign object removal unit 4 is activated, the electromagnet 41 of the foreign object removal unit 4 generates magnetic force.

Figure 5B:
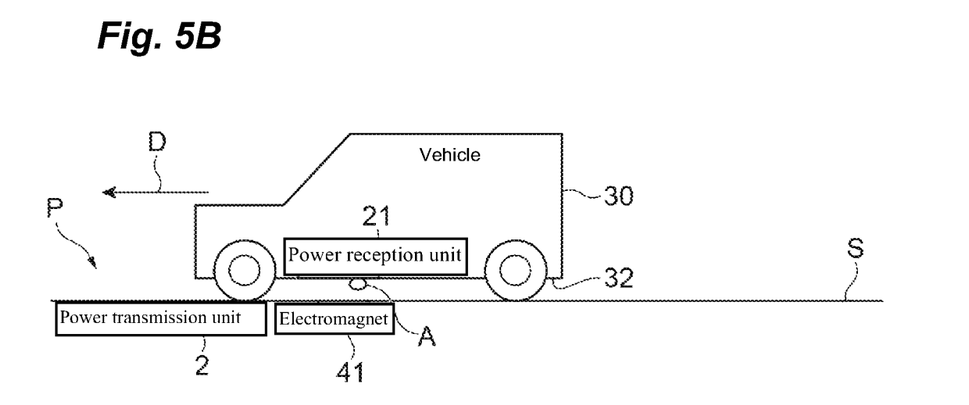

As shown in FIG. 2, FIG. 5A, and FIG. 5B, the electromagnet 41 of the foreign object removal unit 4 is installed in the route D by which the vehicle 30 reaches the power transmission unit 2 on the road surface S, and hence the electromagnet 41 removes the foreign object A from the vehicle-body undersurface 32 by attracting the foreign object A to the electromagnet 41 from the vehicle-body undersurface 32 by the magnetic force of the electromagnet 41 when the foreign object A is a ferromagnet such as iron. Even when the foreign object A is a paramagnet such as aluminum, as described above, the magnetic field by the eddy current is generated as a result of the foreign object A passing through the magnetic field of the electromagnet 41, a force works on the foreign object A in the direction opposite to the traveling direction of the vehicle 30, and the electromagnet 41 removes the foreign object A from the vehicle-body undersurface 32.

Figure 5C:
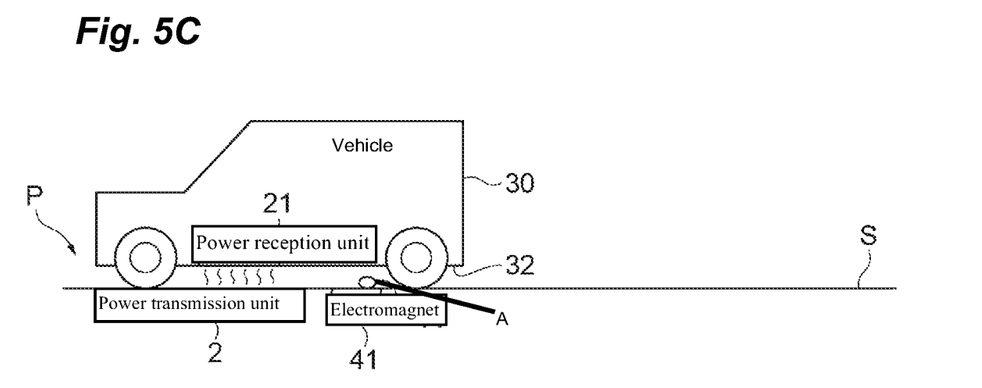

As shown in FIG. 4 and FIG. 5C, when the foreign object removal unit 4 is activated and the detection unit 5 detects the stopping of the vehicle 30 in the position in which the power transmission unit 2 and the power reception unit 21 face each other (S4), the control unit 6 stops the activation of the foreign object removal unit 4 (S5). The road surface maintenance unit 7 removes the foreign object A that has been removed from the vehicle-body undersurface 32 by the electromagnet 41 of the foreign object removal unit 4 and has fallen on the road surface S from the road surface S (S6). Note that the removal of the foreign object A from the road surface S by the road surface maintenance unit 7 may be performed before the stopping of the vehicle 30 and the foreign object removal unit 4. As shown in FIG. 4 and FIG. 5C, wireless power transfer from the power transmission unit 2 of the power transmission device 1 installed on the road surface S to the power reception unit 21 of the power reception device 20 mounted on the vehicle-body undersurface 32 of the vehicle 30 is performed (S7).

According to this embodiment, in the foreign object removal device 3 that removes the foreign object A on the vehicle-body undersurface 32 of the vehicle 30 traveling the road surface S in the wireless power transfer from the power transmission unit 2 of the power transmission device 1 installed on the road surface S to the power reception unit 21 of the power reception device 20 mounted on the vehicle-body undersurface 32, the foreign object A on the vehicle-body undersurface 32 is removed by the foreign object removal unit 4 installed on the road surface S around the power transmission unit 2. Therefore, the foreign object A on the power reception unit 21 can be removed and a case where the removed foreign object A falls on the power transmission unit 2 can be reduced.

For example, in the technology of removing the foreign object A by using the coil of the power transmission unit 2 as an electromagnet, a case where the coils of the power transmission unit 2 and the power reception unit 21 are installed to face each other in the horizontal direction without installing the coil of the power transmission unit 2 on the road surface S in order to prevent the foreign object A from falling on the coil of the power transmission unit 2 can be conceived. In the technology of removing the foreign object A by using the coil of the power transmission unit 2 as an electromagnet, a case where the shape of the coil of the power transmission unit 2 installed on the road surface S is caused to be a shape in which a central portion thereof is protruding can be conceived. However, when the power transmission device 1 is installed on the road surface S of the parking space P, it is difficult to install the coils of the power transmission unit 2 and the power reception unit 21 to face each other in the horizontal direction and cause the shapes of the coils of the power transmission unit 2 and the power transmission unit 2 to be shapes in which central portions thereof are protruding. Therefore, it is difficult to prevent the foreign object A removed from the power reception unit 21 from falling on the power transmission unit 2. Meanwhile, in this embodiment, the foreign object removal unit 4 is installed on the road surface S around the power transmission unit 2, and hence the foreign object A on the power reception unit 21 can be removed and a case where the removed foreign object A falls on the power transmission unit 2 can be reduced.

According to this embodiment, the foreign object removal unit 4 has the electromagnet 41 installed on the road surface S, and hence the foreign object A on the vehicle-body undersurface 32 can be removed by a simple configuration.

According to this embodiment, the approach of the vehicle 30 to either the power transmission unit 2 or the foreign object removal unit 4 is detected by the detection unit 5. By the control unit, the foreign object removal unit 4 is stopped when the detection unit 5 is not detecting the approach of the vehicle 30 to either the power transmission unit 2 or the foreign object removal unit 4, and the foreign object removal unit 4 is activated when the detection unit 5 detects the approach of the vehicle 30 to either the power transmission unit 2 or the foreign object removal unit 4. Therefore, it is possible to activate the foreign object removal unit 4 only when necessary, and the energy consumed by the foreign object removal unit 4 can be reduced.

According to this embodiment, the stopping of the vehicle 30 in the position in which the power transmission unit 2 and the power reception unit 21 face each other is detected by the detection unit 5. When the foreign object removal unit 4 is activated and the stopping of the vehicle 30 in the position in which the power transmission unit 2 and the power reception unit 21 face each other is detected by the detection unit 5, the power transmission unit 2 and the power reception unit 21 are facing each other, and the removal of the foreign object A adhering to the power reception unit 21 by the foreign object removal unit 4 installed on the road surface S around the power transmission unit 2 becomes difficult. Therefore, the activation of the foreign object removal unit 4 by the control unit 6 is stopped. As a result, the foreign object removal unit 4 is activated only when a possibility that the foreign object removal unit 4 can remove the foreign object A is high, and the energy consumed by the foreign object removal unit 4 can be reduced.

According to this embodiment, the foreign object A that has been removed from the vehicle-body undersurface 32 by the foreign object removal unit 4 and has fallen on the road surface S is removed from the road surface S by the road surface maintenance unit 7, and hence a case where the foreign object A removed from the vehicle-body undersurface 32 by the foreign object removal unit 4 comes into contact with the power transmission unit 2 on the road surface S by wind and the like can be reduced.

According to this embodiment, the foreign object removal unit 4 is installed in the route D by which the vehicle 30 reaches the power transmission unit 2 on the road surface S, and hence the foreign object on the vehicle-body undersurface 32 can be removed more reliably before the wireless power transfer.

Figure 6:
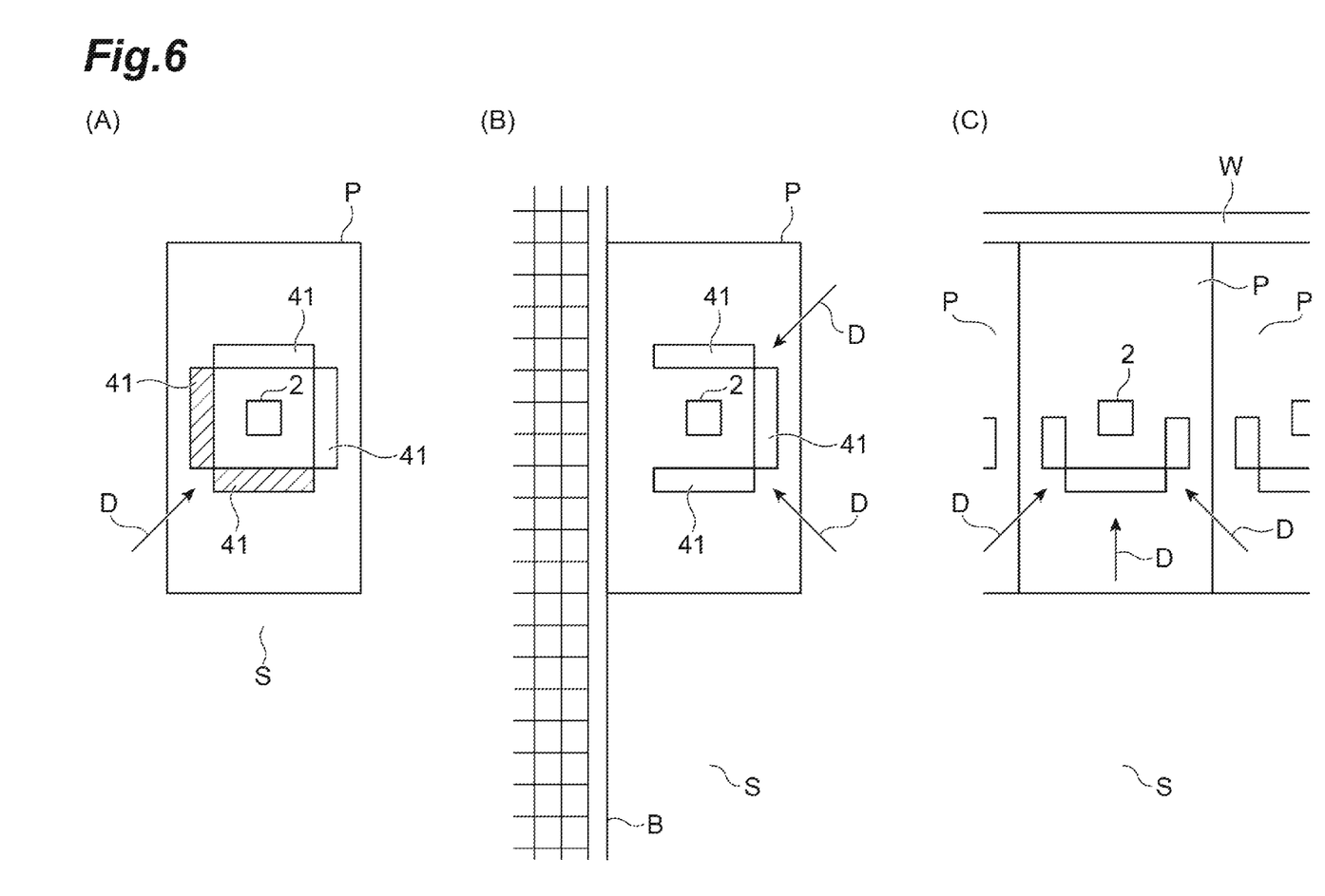
FIG. 6A, FIG. 6B, and FIG. 6C are plan views showing other examples of the arrangement of the power transmission unit and the electromagnets with respect to routes of the vehicle in the parking space.

The embodiment and the modification of the present disclosure have been described above, but the present disclosure is not limited to the abovementioned embodiment. For example, the position in which the foreign object removal unit 4 is installed may be changed, as appropriate. For example, as shown in FIG. 6A, when the vehicle 30 can reach the power transmission unit 2 installed on the road surface S of the parking space P from all directions, the electromagnets 41 of the foreign object removal unit 4 may be installed in all positions around the power transmission unit 2 in order to correspond to a plurality of the routes D of the vehicles 30. In this case, as shown in FIG. 6A by diagonal lines, it is possible for the control unit 6 to activate only the electromagnet 41 on the route D of the vehicle 30 detected by the detection unit 5.

For example, as shown in FIG. 6B, when the parking space P is disposed to be adjacent to a road shoulder B and the vehicle 30 can reach the power transmission unit 2 installed on the road surface S of the parking space P from directions other than that of the road shoulder B, the electromagnets 41 of the foreign object removal unit 4 may be installed in positions around the power transmission unit 2 except for that of the road shoulder B. For example, as shown in FIG. 6C, when the parking space P is disposed to be adjacent to a wall W and the vehicle 30 can reach the power transmission unit 2 installed on the road surface S of the parking space P from directions other than that of the wall W, the electromagnets 41 of the foreign object removal unit 4 may be installed in positions around the power transmission unit 2 except for that of the wall W.

For example, the foreign object removal unit 4 may include a brush that abuts against the vehicle-body undersurface 32 and removes the foreign object A. For example, the foreign object removal unit 4 may include a nozzle that removes the foreign object A by jetting out gas and liquid to the vehicle-body undersurface 32. For example, the foreign object removal unit 4 may include a permanent magnet. For example, the road surface maintenance unit 7 may be a groove installed to be adjacent to the power transmission unit 2 around the power transmission unit 2.

For example, the control unit 6 does not necessarily need to stop the activation of the foreign object removal unit 4 when the foreign object removal unit 4 is activated and the detection unit 5 detects the stopping of the vehicle 30. For example, when the distance between the power transmission unit 2 and the foreign object removal unit 4 installed on the road surface S is about several meters, the control unit 6 may continue the activation of the foreign object removal unit 4 when the detection unit 5 detects any of the stopping, the passing, and the reciprocal motion of the vehicle 30 above the foreign object removal unit 4, and the control unit 6 may stop the activation of the foreign object removal unit 4 when the detection unit 5 detects the separation of the vehicle 30 from the foreign object removal unit 4.

INDUSTRIAL APPLICABILITY

According to the foreign object removal device and the power transmission device of the present disclosure, the foreign object on the power reception unit can be removed and a case where the removed foreign object falls on the power transmission unit can be reduced.

REFERENCE SIGNS LIST

1 Power transmission device
2 Power transmission unit
3 Foreign object removal device
4 Foreign object removal unit
5 Detection unit
6 Control unit
7 Road surface maintenance unit
11 Power source
12 Converter
13 Inverter
14 Power transmission control unit
20 Power reception device
21 Power reception unit
22 Rectifier
23 Battery
30 Vehicle
31 Wheel
32 Vehicle-body undersurface
41 Electromagnet
71a, 71b, 71c, 71d Electromagnet
72 Groove
73 Recessed portion
74 Grating
S Road surface
P Parking space
D Route
A Foreign object
B Road shoulder
W Wall

The invention claimed is:

1. A foreign object removal device for removing a foreign object on a vehicle-body undersurface of a vehicle traveling a road surface in wireless power transfer from a power transmission unit of a power transmission device installed on the road surface to a power reception unit of a power reception device mounted on the vehicle-body undersurface, the foreign object removal device comprising; a foreign object removal unit installed on the road surface around the power transmission unit and configured to remove the foreign object on the vehicle-body undersurface;
a detection unit configured to detect an approach of the vehicle to either the power transmission unit or the foreign object removal unit: and
a control unit configured to activate the foreign object removal unit when the detection unit detects the approach to the foreign object removal unit of the vehicle at a position where the power transmission unit is not facing the power reception unit,
wherein the foreign object removal unit removes the foreign object adhering to the power reception unit on a condition that the power transmission unit is not facing the power reception unit, such that the foreign object removed from the power reception unit does not fall on the power transmission unit, and
on a condition that the detection unit detects a stopping of the vehicle which has moved to a position where the power transmission unit is facing the power reception unit while the foreign object removal unit is being activated, the control unit stops the foreign object removal unit, wherein the foreign object removal unit is installed on the road surface around the power transmission unit where a removal of the foreign object adhering to the power reception unit by the foreign object removal unit becomes difficult when the power transmission unit is facing the power reception unit.

2. The foreign object removal device according to claim 1, further comprising a road surface maintenance unit removing the foreign object that has been removed from the vehicle-body undersurface by the foreign object removal unit and has fallen on the road surface from the road surface.

3. The foreign object removal device according to claim 1, wherein the foreign object removal unit is installed in a route by which the vehicle reaches the power transmission unit on the road surface.

4. A power transmission device, comprising: the foreign object removal device according to claim 1; and the power transmission unit.

5. A foreign object removal device for removing a foreign object on a vehicle-body undersurface of a vehicle traveling a road surface in wireless power transfer from a power transmission unit of a power transmission device installed on the road surface to a power reception unit of a power reception device mounted on the vehicle-body undersurface, the foreign object removal device comprising;
a foreign object removal unit installed on the road surface around the power transmission unit and removes the foreign object adhering to the power reception unit on a condition that the power transmission unit is not facing the power reception unit, such that the foreign object removed from the power reception unit does not fall on the power transmission unit;
a detection unit configured to detect an approach of the vehicle to either the power transmission unit or the foreign object removal unit; and
a control unit configured to activate the foreign object removal unit when the detection unit detects the approach to the foreign object removal unit of the vehicle at a position where the power transmission unit is not facing the power reception unit, wherein the foreign object removal unit faces the power reception unit when the power transmission unit is not facing the power reception unit,
the foreign object removal unit has an electromagnet installed on the road surface, and
on a condition that the detection unit detects a stopping of the vehicle which has moved to a position where the power transmission unit is facing the power reception unit while the foreign object removal unit is being activated, the control unit stops the foreign object removal unit,
wherein the foreign object removal unit is installed on the road surface around the power transmission unit where a removal of the foreign object adhering to the power reception unit by the foreign object removal unit becomes difficult when the power transmission unit is facing the power reception unit.

* * * * *